(12) United States Patent
Mersch

(10) Patent No.: US 7,071,637 B2
(45) Date of Patent: Jul. 4, 2006

(54) WINDOW LIFTER CONTROL SYSTEM AND METHOD OF CONTROLLING WINDOW LIFTERS

(75) Inventor: Gerhard Mersch, Uetze (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/705,554

(22) Filed: Nov. 10, 2003

(65) Prior Publication Data

US 2004/0095084 A1 May 20, 2004

(30) Foreign Application Priority Data

Nov. 18, 2002 (DE) .............................. 102 53 643

(51) Int. Cl.
*H02P 5/46* (2006.01)
*H02P 1/54* (2006.01)

(52) U.S. Cl. .................. 318/62; 318/280; 318/283; 318/286; 318/466; 318/468

(58) Field of Classification Search .............. 318/62, 318/280–286, 466, 138, 439, 254, 700, 468, 318/799
See application file for complete search history.

(56) References Cited

U.S. PATENT DOCUMENTS 3,386,022 A * 5/1968 Redmond, Jr. .............. 318/483
4,427,929 A 1/1984 Marcel et al.
4,536,687 A * 8/1985 Kurihara et al. ............ 318/480
4,870,333 A * 9/1989 Itoh et al. ................... 318/286
6,430,874 B1 8/2002 Korte
6,541,929 B1 * 4/2003 Cregeur ...................... 318/283

FOREIGN PATENT DOCUMENTS

| DE | 199 21 640 A1 | 11/2000 |
| DE | 198 31 806 A | 4/2001 |
| JP | 10-102905 | * 4/1998 |
| JP | 10-102911 | * 4/1998 |

OTHER PUBLICATIONS

Search Report, Australian Patent Office, dated Jan. 16, 2003.

* cited by examiner

*Primary Examiner*—Trina Duda
*Assistant Examiner*—Tyrone Smith
(74) *Attorney, Agent, or Firm*—Carlson, Gaskey & Olds

(57) ABSTRACT

A window lifter system and method coordinates closing of multiple windows by detecting when more than one window pane is approaching a fully closed position and moving one window pane to only an approximately closed position while the other window pane is moved to the fully closed position. By staggering the closure of window panes to the fully closed positions, the system and method provides the illusion that all of the window panes are being closed at the same time while avoiding voltage drops in the vehicle power supply caused by excessively high blocking currents generated when multiple window panes are moved to the fully closed position.

9 Claims, 2 Drawing Sheets

WINDOW LIFTER CONTROL SYSTEM AND METHOD OF CONTROLLING WINDOW LIFTERS

REFERENCE TO RELATED APPLICATIONS

The present invention claims the benefit of German Patent Application No. 102 53 643.0, filed Nov. 18, 2002.

TECHNICAL FIELD

The present invention relates to a window lifter control system for a motor vehicle and a method of controlling at least two window lifter motors.

BACKGROUND OF THE INVENTION

When an electric window lifter motor of a window lifter fully closes a window pane, the window lifter motor is rotationally driven to close the window pane until the window pane presses against an associated seal on the window frame with a desirably high amount of force, causing the window pane to come to a stop. The window lifter motor is blocked when the window pane is stopped by the seal, causing a high blocking current (e.g., 30A) to flow through the window lifter motor. This is acceptable as long as the blocking current flows through only one window lifter motor in the vehicle.

However, currently available comfort functions in vehicles are able to close all of the window panes of the vehicle simultaneously. In fact, some consumers find it disturbing when, in spite of identical starting positions, different window panes in the vehicle reach the fully closed position at different times even though the associated window lifters received the instruction to close the window panes at the same time. But if all of the window panes are actually closed at the same time, this can result in as many as four window lifter motors being supplied with the blocking current at the same time. The high amount of blocking current to the window lifter motors leads to a noticeable voltage drop in the power supply of the vehicle. This voltage drop is especially critical if the vehicle is provided with other electric systems which have high power requirements themselves, such as an electrical steering system ("steer-by-wire") or an electrical brake system ("brake-by-wire"). As soon as a control unit in such systems detects the voltage drop, the system may be momentarily disconnected until the voltage drop is over. Obviously, however, it is undesirable in an electrical steering system or an electrical brake system for a functional interruption to occur.

There is a desire for a window lifter system in which, on the one hand, can meet the demands in relation to comfort (e.g., simultaneous window closing) made by the ultimate customers and, on the other hand, avoids voltage drops in the on-board supply when meeting those demands.

SUMMARY OF THE INVENTION

One embodiment of the invention is directed to a method of controlling at least two window lifter motors. When at least one of the window lifter motors is instructed to close the window pane associated with the motor to it, the method determines whether the window pane is approaching its fully closed position. The method then checks whether any other window pane is approaching its own fully closed position. If any other window pane is approaching its fully closed position, the original window pane is moved only as far as to an approximately closed position rather than its fully closed position. If, on the other hand, no other window pane is approaching its fully closed position, the window pane is moved to its fully closed position.

The invention generally prevents a plurality of window lifters from fully closing their respectively assigned window panes at the same time. Instead, only the window lifter that is the first one to close the window pane is allowed to close the window pane fully, causing the window lifter motor to block and blocking current to flow. All other window lifter motors in the vehicle are turned off so that the window pane does not reach its fully closed position and only reaches an approximately closed position in which it contacts its associated seal with a low force. The contact gives a vehicle user the impression that the window pane is already fully closed and that all window panes were closed simultaneously.

Once the first window pane is fully closed, all the remaining window panes will then also be fully closed, occurring in a staggered relationship with respect to one another so that only one single window lifter motor is blocked at any given time when the window pane presses against its corresponding seal. The short time interval between the time the first window pane closes fully and the time the other window panes closes fully will go unnoticed by the user. The minimum adjustment of the window pane from the approximately closed position to the fully closed position will not be detectable by the user of the vehicle, and as a result the invention will not impair user comfort.

The moment at which each window pane enters a previously defined end zone portion of its travel distance may be used as a criterion for the decision of which window pane should be allowed to be fully closed. This end zone may cover, for instance, the last 4 mm of the distance traveled before reaching the fully closed position. As soon as a window pane enters this end zone, a blocking signal is transmitted by a controller of the respective window lifter and transferred via a bus system to all other window lifter controllers in the vehicle. If any other controller receives the blocking signal when the window pane assigned to it arrives at the end zone, the other controller will not close the window pane fully, but move it only into the approximately closed position.

As soon as a window lifter has shifted the window pane into its approximately closed position, it is checked in a loop to see whether the previously received blocking signal continues to be applied. As soon as the blocking signal is no longer applied, a counter starts, initiating a waiting time corresponding to each window controller. After the waiting time has elapsed, the window lifter motor for a given window is driven to move the window pane into its fully closed position while a blocking signal is sent at the same time. This prevents any of the other window lifters from simultaneously shifting their respectively assigned window panes from the approximately closed position to the fully closed position. The blocking signals and waiting times stagger the times at which each window is moved to the fully closed position so that only one window is moved to the fully closed position at a time.

In one embodiment of the invention, the method suppresses detection of multiple window pane closings when the engine of the vehicle is not running because, in this case, there are no expected negative effects if the multiple window closings create a voltage drop in the on-board voltage supply.

Another embodiment of the invention is directed to a window lifter control system comprising at least two window lifter motors, at least one controller for driving the window lifter motors, and a sensor that detects the position of a window pane assigned to the window lifter motor. The controller includes a checking circuit that checks whether any other window lifter is a transmitting a blocking signal. The system further includes a blocking signal generator, which generates a blocking signal when the window lifter motor causes its corresponding window pane to approach its fully closed position, and a counter that can detect an expiration of a predetermined waiting time. The description below explains the advantages that may be gained using a window lifter control system of this type in more detail.

BRIEF DESCRIPTION OF THE DRAWINGS

The invention will now be described with reference to a preferred embodiment which is illustrated in the accompanying drawings, in which.

DETAILED DESCRIPTION OF THE EMBODIMENTS

Figure 1:
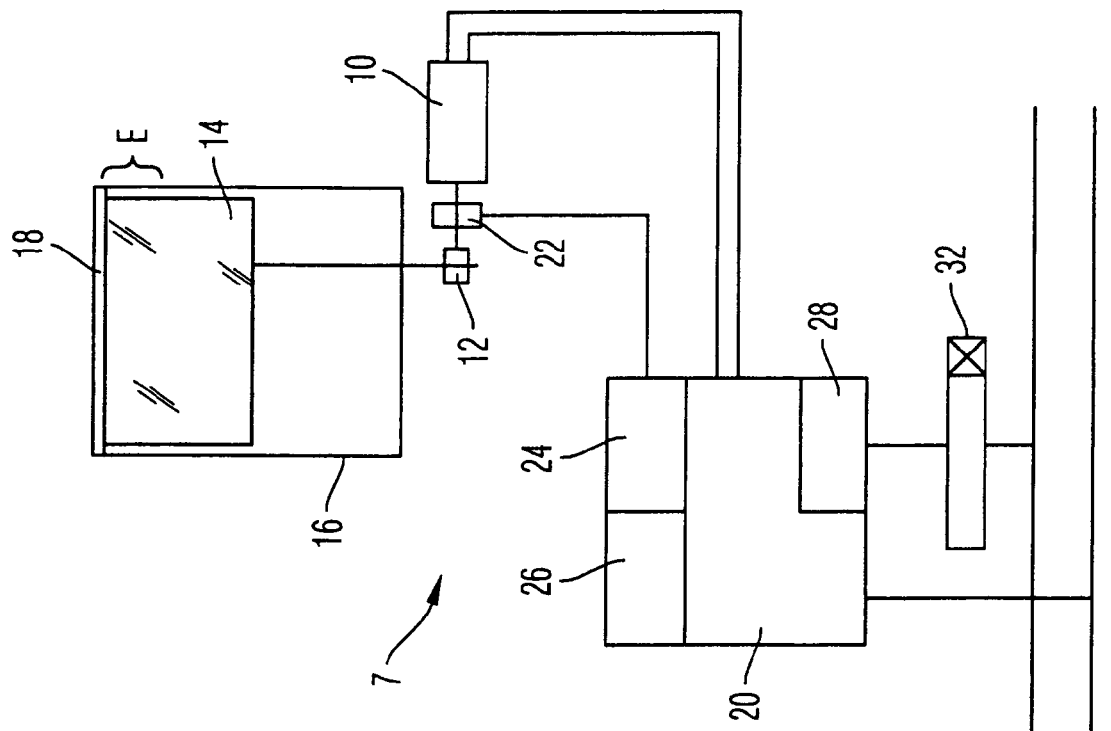
FIG. 1 is a representative diagram of a window lifter system including two window lifters according to one embodiment of the invention.
Figure 1:
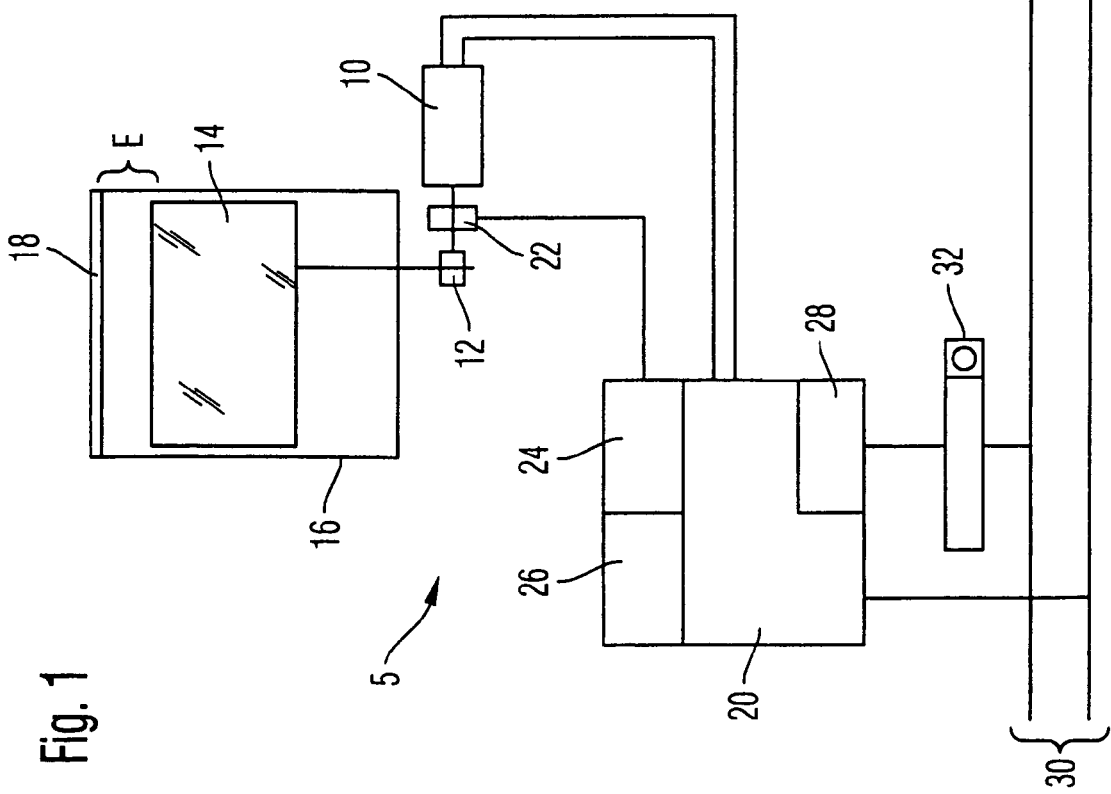
Figure 2:
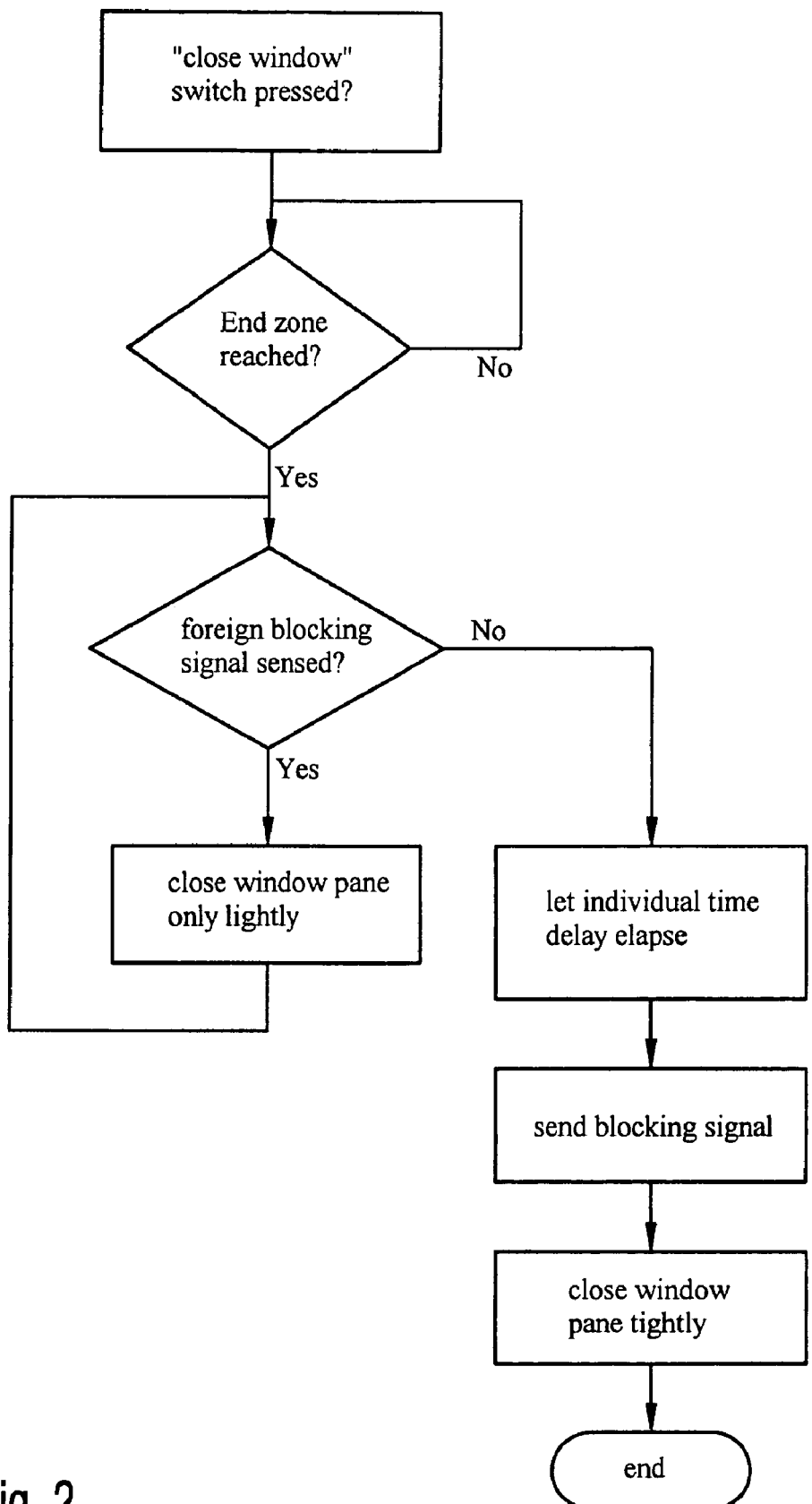
FIG. 2 is a representative flow diagram of a method that may be sequenced in one of the window lifters of FIG. 1.

FIG. 1 is a representative diagram of a window lifter system according to one embodiment of the invention and FIG. 2 is a flow diagram of a method according to one embodiment of the invention. Note that although FIG. 1 shows only two window lifters 5, 7 for illustrative purposes, the system may include more than two window lifters without departing from the scope of the invention.

In the embodiment shown in FIG. 1, each window lifter 5, 7 has a window lifter motor 10 which acts on a window pane 14 of a vehicle via an adjustment mechanism 12. The window pane 14 is adapted to be shifted within a window frame 16, which is provided at least at its upper edge with a seal 18, shown schematically in FIG. 1. The window pane 14 can be moved in the window frame 16 by the window lifter motor 10.

A controller 20 is provided for driving the window lifter motor 10. The controller 20 is usually disposed inside the vehicle door in which the window pane 14 is guided and is therefore frequently referred to as a door control module. Each controller 20 drives the window lifter motor 10 by, for example, pulse width modulation. A sensor 22 is provided on the window lifter motor 10 through which a position recognition circuit 24 inside the controller 20 may sense the absolute position of the window pane 14. In one embodiment, the sensor 22 may be a Hall effect sensor.

The controller 20 further includes a counter 26 that generates a waiting time. In one embodiment, the counters associated which each controller 20 differ from one another so that each controller 20 in the vehicle each has its own unique waiting time.

Each controller 20 further contains a blocking signal checking and generating circuit 28, each of which is able to generate a blocking signal and to sense whether any other controller generates such blocking signal.

The controllers 20 are connected to a bus system 30, such as a CAN bus.

The operation of the window lifter system will now be described when it is intended to close the window panes 14, reference being also made to the flow chart of FIG. 2.

When a vehicle user wishes to close a particular window pane 14 such as, for example, the window pane associated with the right-hand window lifter 7 in FIG. 1, the user actuates the appropriate window lifter switch so that the controller 20 drives the window lifter motor 10 in the proper direction for the window pane 14 to be closed. During the closing process of the window pane 14, the absolute position of the window pane 14 sent to the controller 20 at all times since the sensor 22 continuously supplies information about the position of the window lifter motor 10.

When the window pane 14 arrives at an end zone E, which is defined as, for example, the last 4 mm of the closing travel before reaching the fully closed position, the blocking signal checking and generating circuit 28 checks, by way of the bus system 30, whether any other controller 20 is transmitting a blocking signal 32. The blocking signal may be, for example, one bit that is encoded in a specific way corresponding to a given controller 20 with the bus system 30, with each bit encoded in a unique manner to correspond with its associated controller 20. In the example shown in FIG. 1, the blocking signal checking and generating circuit 28 of the controller 20 of the left-hand window lifter 5 does not send a blocking signal. Therefore, the blocking signal checking and generating circuit 28 of the controller 20 associated with the right-hand window lifter 7 will now generate a blocking signal, which is transmitted to all other controllers 20 in the vehicle via the bus 30.

At the same time, since the blocking signal checking and generating circuit 28 of the right-hand window lifter 7 is not currently receiving a foreign blocking signal, the right-hand window lifter motor 10 continues to be supplied with power until the window pane 14 comes up against the seal 18 at full power and comes to a stop. As a result of this, the right-hand window lifter motor 10 is also braked to a standstill and the window lifter motor 10 consumes its blocking current. The high torque produced by the window lifter motor 10 in this condition ensures that the right-hand window pane 14 is pressed against the seal 18 with a desirably high force to ensure that the window pane 14 is fully closed tightly.

The window pane of the left-hand window lifter 5 is also closed at approximately the same time as the window pane 14 of the right-hand window lifter 7. However, since the window pane of the left-hand window lifter 5 slightly lags behind the window pane of the right-hand window lifter 7, the window pane 14 of the left-hand window lifter 5 will enter the end zone slightly later than that of the right-hand window lifter 7. At the moment the controller 20 detects that the left-hand window pane 14 has arrived at the end zone E, the blocking signal checking and generating circuit 28 detects that a foreign controller 20 is generating a blocking signal, namely the controller 20 of the right-hand window lifter 7. The left-hand window lifter motor 10 is therefore stopped before the window pane 14 rides up on the seal 18 and is braked by the window pane 14; in other words, the left-hand window lifter motor 10 is stopped so that the window pane 14 is in an approximately closed position in which it contacts the seal 18 with a low force.

The controller 20 subsequently checks whether any foreign blocking signal is continuing to be received. As soon as the controller 20 no longer detects a foreign blocking signal, the counter 26 is activated, which generates a specific time delay or waiting time. After expiration of this time delay, the blocking signal checking and generating circuit 28 transmits its own corresponding blocking signal while the left-hand window lifter motor 10 is at the same time supplied with power so that the left-hand window pane travels from the approximately closed position to the fully closed position until it is braked by the seal 18 and until the left-hand window lifter motor 10 is blocked.

While only two window lifters are shown in FIG. 1, it is readily apparent that the window panes can be closed in a time-staggered as described above and as shown in FIG. 2 when more than two window lifters are provided. In the case of systems having more than two window panes and more than two associated window lifters, only the window pane that is the first to enter the end zone E is closed fully without interruption, whereas all other window panes will be stopped at the approximately closed position and closed one after the other in a staggered fashion into the fully closed position based on the different waiting times as generated by the counter 26 of each respective controller 20.

It should be understood that various alternatives to the embodiments of the invention described herein may be employed in practicing the invention. It is intended that the following claims define the scope of the invention and that the method and apparatus within the scope of these claims and their equivalents be covered thereby.

The invention claimed is:

1. A window lifter control system comprising:
   a first and a second window lifter motor;
   a first and a second controller that drive the first and second window lifter motors, respectively; and
   a first and a second sensor that respectively detect a position of first and second window panes associated with the first and second window lifter motors, respectively,
   wherein the first and second controllers each comprise:
   a blocking signal generator that generates a blocking signal when at least one of the first and second sensors indicates that at least one of the first and second window panes is approaching a fully closed position thereof, and
   a checking circuit that checks whether one of the first and second controllers is transmitting a blocking signal,
   wherein the first controller causes the first window lifter motor to move the first window pane to an approximately closed position if the checking circuit detects the blocking signal from the second controller and causes the first window lifter motor to move the first window pane to a fully closed position if the checking circuit does not detect the blocking signal from the second controller wherein the fully closed position comprises a position where an upper edge portion of a window pane presses against an associated window seal.

2. The window lifter control system as claimed in claim 1, wherein the first and second sensors are Hall effect sensors that sense a position of a rotor of the first and second window lifter motors, respectively.

3. The window lifter control system as claimed in claim 1, wherein the first and second controllers each further comprise a counter, wherein the counter in the first controller delays movement of the first window pane to the fully closed position by the first window lifter motor until the counter has reached a predetermined value corresponding to a waiting time.

4. The window lifter control system as claimed in claim 3, wherein each of the counters have waiting times, with respective waiting times corresponding to the counters in the first and second controllers being different.

5. The window lifter control system as claimed in claim 1, wherein the blocking signal generator generates the blocking signal when the first window lifter motor moves the first window pane to the fully closed position.

6. The window lifter control system as claimed in claim 1, wherein the first and second controllers control the first and second window lifter motors, respectively, by pulse width modulation.

7. The window lifter control system as claimed in claim 1, wherein the first and second controllers are connected to a bus.

8. The window lifter control system as claimed in claim 1, wherein the checking circuit and the blocking signal generator are integrated together to form a blocking signal checking and generating circuit.

9. The window lifter control system as claimed in claim 1, wherein the first controller stops the first window pane at the approximately closed position when the second window pane is approaching the fully closed position, and wherein the first controller subsequently moves the first window pane from the approximately closed position to the fully closed position once the second window pane is in the fully closed position.

* * * * *